(12) United States Patent
Dooley et al.

(10) Patent No.: US 6,352,225 B1
(45) Date of Patent: Mar. 5, 2002

(54) HOLDER FOR FLEXIBLE COLLECTION BAGS

(75) Inventors: Ronald M. Dooley, Okemos; Ronald E. Dooley, Livonia, both of MI (US); Jeffrey A. Jackson, Yuma, AZ (US)

(73) Assignee: Tri-State Hospitol Supply Corporation, Howell, MI (US)

( * ) Notice: Subject to any disclaimer, the term of this patent is extended or adjusted under 35 U.S.C. 154(b) by 0 days.

(21) Appl. No.: 09/655,592

(22) Filed: Sep. 6, 2000

(51) Int. Cl.⁷ .............................................. A63B 55/08
(52) U.S. Cl. ........................ 248/98; 280/47.24; 220/908
(58) Field of Search .............................. 248/98, 95, 97, 248/99, 175; 280/47.24; 220/908, 908.1

(56) References Cited

U.S. PATENT DOCUMENTS

| 5,445,398 A | * 8/1995 | Pierce ..................... 280/47.24 |
| 5,456,431 A | * 10/1995 | Ilnisky ........................ 248/98 |
| 6,092,767 A | * 7/2000 | Schrager ..................... 248/98 |

* cited by examiner

Primary Examiner—Ramon O. Ramirez
(74) Attorney, Agent, or Firm—Fildes & Outland, P.C.

(57) ABSTRACT

A collection bag holder disclosed supports flexible linen and/or trash collection bags, and comprises a one-piece tubular frame. The one-piece tubular frame includes an upper bag supporting portion, a lower base portion and an intermediate upright portion. A mount including one of a collection bag feeder and an attachment bag holder is fixed on the tubular frame for supporting a supply of flexible collection bags.

6 Claims, 3 Drawing Sheets

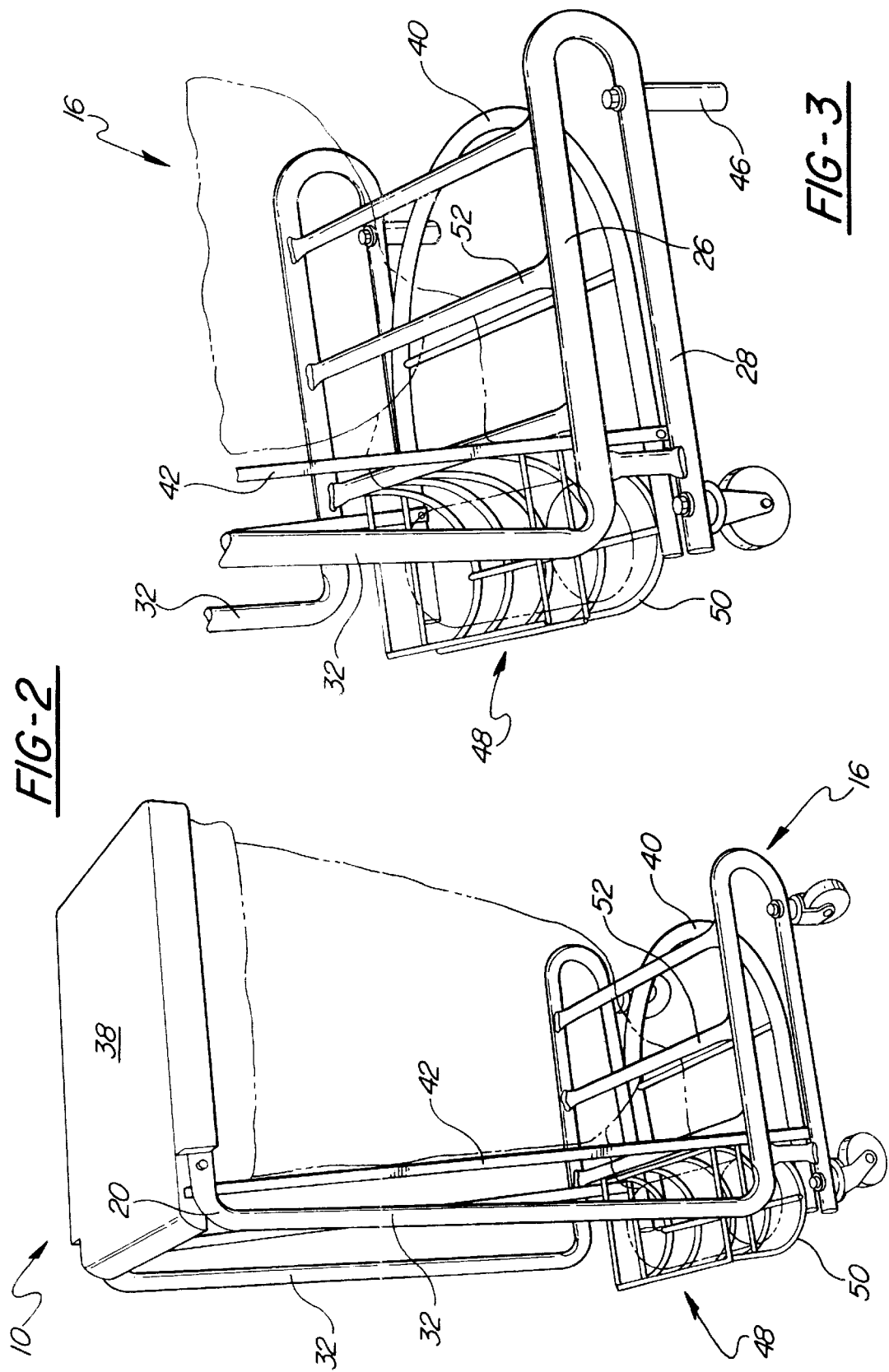

HOLDER FOR FLEXIBLE COLLECTION BAGS

FIELD OF THE INVENTION

This invention relates to a frame or support for holding cloth or plastic collection bags and more particularly to a holder of medical laundry and trash bags that provides bag storage and dispensing features.

BACKGROUND OF THE INVENTION

It is known in the art relating to collection bag holders to use a frame having a bag supporting portion to support a non-self supporting collection bag of cloth or plastic construction.

Typically, a portion of the flexible bag adjacent its opening is disposed over the bag supporting portion and a retainer of some type is used to hold the bag on the bag supporting portion. Alternatively, a portion of the flexible bag adjacent its opening is disposed over a bag supporting loop that rests on the bag supporting portion of the frame.

These collection bag holders make no provision for feeding flexible collection bags in a rolled web form from a storage site on the holder to the bag supporting portion. Neither do these collection bag holders make any provision for storing or mounting a supply of flexible collection bags not in a rolled web form.

SUMMARY OF THE INVENTION

The present invention provides a holder for flexible collection bags that includes means for mounting a supply of flexible collection bags not in a rolled web form.

The present invention also provides a collection bag feeder for dispensing flexible collection bags from a rolled web to a bag support.

More specifically, the collection bag holder supports flexible linen and/or trash collection bags, and comprises a one-piece tubular frame. The one-piece tubular frame includes an upper bag supporting portion, a lower base portion and an intermediate upright portion.

The bag supporting portion is generally U-shaped and extends in a horizontal plane. At the ends of the U the tubes turn downwardly into the upright portion defined by parallel spaced vertically disposed segments extending downwardly. These segments then turn outwardly and continue to form the base portion. The base portion is defined by spaced end segments generally extending in a horizontal plane.

A horizontal element is mounted across the end portions of the bag supporting portion. A bag holding loop is pivotably mounted on the horizontal element such that the loop is positioned on top of the bag supporting portion. A lid is also pivotably mounted on the horizontal element. A foot operated actuator is pivotably mounted on the base portion and linkage operably connects the foot operated actuator and the lid whereby foot pressure on the actuator causes the lid to be moved toward an open position.

In one embodiment a pair of wheels or casters is mounted about the base portion together with a pair of downwardly extending supports. In another embodiment two pair of wheels or casters are mounted about the base portion.

A mount comprising one of a collection bag feeder and an attachment bag holder is fixed on the tubular frame for supporting a supply of flexible collection bags.

The attachment bag holder is a pair of spaced axially aligned posts each extending horizontally from one of the spaced segments of the upright portion toward the other of the segments.

The collection bag feeder is a basket mounted about the base of frame for dispensing a web of collection bags to the bag supporting portion. A guide mounted on the base between the spaced segments guides the web of flexible collection bags received from the basket.

These and other features and advantages of the invention will be more fully understood from the following detailed description of the invention taken together with the accompanying drawings.

BRIEF DESCRIPTION OF THE DRAWINGS

In the drawings:

FIG. 2 is a perspective view of the collection bag holder of FIG. 1 illustrating the lid closed;

FIG. 3 is a fragmentary perspective view of another arrangement of the collection bag holder illustrating a base portion with two wheels and two downwardly extending supports.

DETAILED DESCRIPTION OF THE INVENTION

Figure 1:
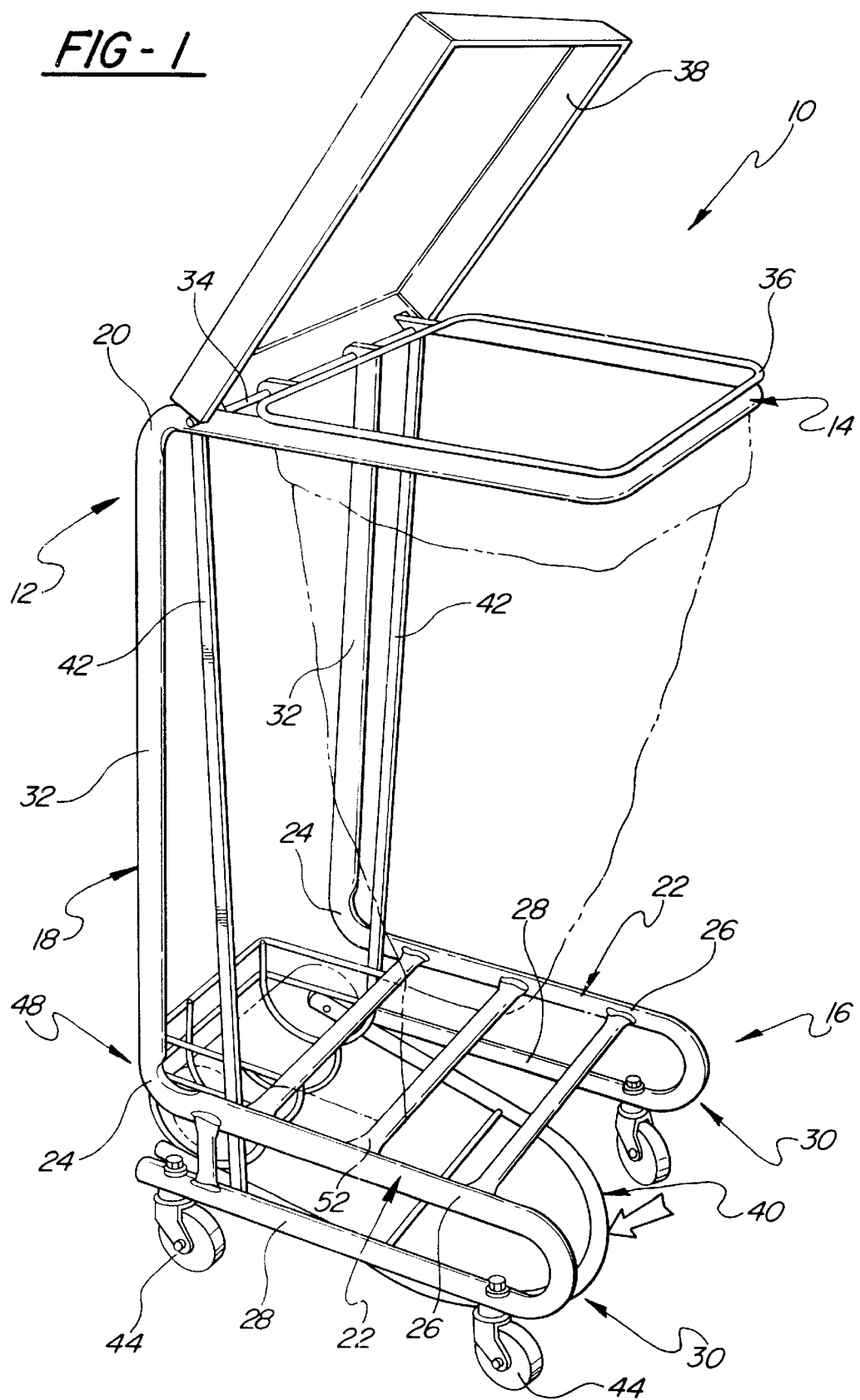
FIG. 1 is a perspective view of a collection bag holder having collection bag feeder constructed in accordance with the present invention and illustrating an actuated foot actuator and open lid.

Referring now to the drawings in detail, numeral 10 generally indicates a collection bag holder for supporting a non-self supporting flexible linen/trash collection bag of cloth or plastic construction used for laundry or medical waste. As is hereinafter more fully described, the collection bag holder 10 provides for mounting a supply of flexible collection bags not in a rolled web form and alternatively when in a rolled web form, a collection bag feeder for dispensing the flexible collection bags from the rolled web.

FIGS. 1–3 illustrate one embodiment of the collection bag holder 10 capable of dispensing flexible collection bags in a rolled web form although the holder can also be used for other type collection bags without using the bag feeder feature. The holder 10 includes a one-piece tubular frame 12 that has a bag supporting portion 14, a base portion 16, and an upright portion 18.

The bag supporting portion 14 is generally of a U-shape extending in a horizontal plane and turning downwardly at ends 20 of the U. The base portion 16 is defined by spaced end segments 22 generally extending in a horizontal plane and turning upwardly at a point 24 toward the bag supporting portion 14. The spaced end segments 22 of the base portion each include upper 26 and lower 28 arms connected at opposite ends to form box-like base elements 30. The upper arms 26 of the base elements 30 are connected together laterally and the lower arms 28 of the base elements are connected to wheels and supports as hereinafter more fully disclosed.

The upright portion 18 is defined by parallel spaced segments 32 generally extending vertically and continuing between the bag supporting 14 and base 16 portions.

A horizontal element 34 or rod is mounted across the end portions 20. A bag holding loop 36 of a shape corresponding to the U shape of the bag supporting portion 14 is pivotably mounted on the horizontal element 34 such that the loop is positioned on top of the bag supporting portion.

A lid 38 is also pivotably mounted on the horizontal element 34 to open and close off the opening of a flexible collection bag supported by the holder 10.

A foot operated actuator 40 is pivotably mounted on the base portion 16. Linkage 42 operably connects the foot operated actuator 40 and the lid 38 whereby foot pressure applied on the actuator causes the lid to be moved toward an open position.

In FIG. 3 a pair of wheels or casters 44 is mounted on the back end of the base portion 16 and a pair of downwardly extending supports 46 is mounted at the front end beneath the base portion. In this arrangement, tilting the holder 10 backward allows the holder to be wheeled around.

In FIGS. 1 and 2 two pairs of wheels or casters 44 are mounted on the base portion 16.

A mount 48 comprising a collection bag feeder 50 is fixed on the tubular frame for supporting a rolled web of flexible collection bags, illustrated in phantom, and feedingly supplying the bags to the bag supporting portion 14. The collection bag feeder 50 is illustrated as a wire frame basket mounted about the base portion 16. A guide 52 is mounted on the base portion 16 between the spaced segments for guiding the web of flexible collection bags received from the basket.

Figure 4:
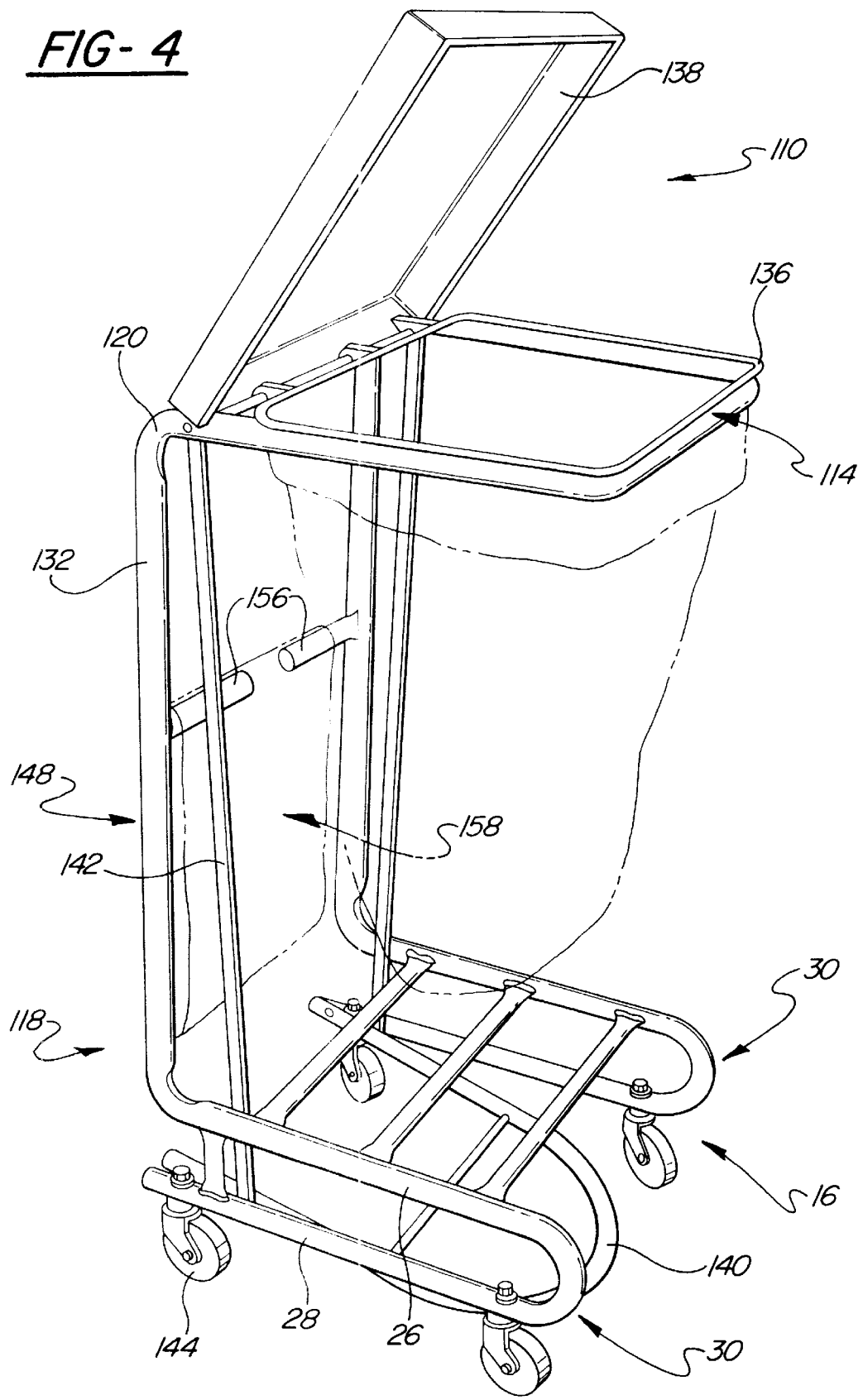
FIG. 4 is a perspective view of a collection bag holder having a bag holder attachment constructed in accordance with the present invention.

FIG. 4 illustrates an alternative embodiment of the collection bag holder 110 wherein like reference characters refer to similar structure. Therein, mount 148 is an attachment bag holder 154 fixed on the tubular frame 112. The attachment bag holder 154 is a pair of spaced axially aligned posts 156 each extending horizontally from one of the spaced segments 132 of the upright portion 118 toward the other of the segments. Such a construction allows an attachment bag 158, illustrated in phantom, to be fitted over the posts 156 and a supply of individual collection bags, cloth or plastic, to be conveniently kept with the holder 110, which previously had been kept separately.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A collection bag holder for supporting a flexible linen/trash collection bag, said holder comprising:
    a one-piece tubular frame including;
        a bag supporting portion generally of a U-shape extending in a horizontal plane and turning downwardly at ends of the U,
        a base portion defined by spaced end segments generally extending in a horizontal plane and turning upwardly at a point toward said bag supporting portion, and
        an upright portion defined by parallel spaced segments generally extending vertically and continuing between said bag supporting and base portions of the U;
    a horizontal element mounted across the end portions;
    a bag holding loop pivotably mounted on the horizontal element of said bag supporting portion such that said loop is positioned on top of the bag supporting portion;
    a lid pivotably mounted on said horizontal element;
    a foot operated actuator pivotably mounted on said base portion;
    linkage operably connecting said foot operated actuator and said lid whereby foot pressure on said actuator causes said lid to be moved toward an open position;
    a pair of wheels mounted about said base portion;
    a pair of downwardly extending supports mounted beneath said base portion; and
    a mount comprising one of a collection bag feeder and an attachment bag holder fixed on said tubular frame for supporting a supply of flexible collection bags.

2. The collection bag holder of claim 1 wherein said attachment bag holder is a pair of spaced axially aligned posts each extending horizontally from one of said spaced segments of said upright portion toward said other of said segments.

3. The collection bag holder of claim 1 wherein said collection bag feeder is a basket mounted about the base of said frame.

4. The collection bag holder of claim 3 further including a guide mounted on said base between said spaced segments for guiding a web of flexible collection bags received from said basket.

5. The collection bag holder of claim 1 wherein said downwardly extending supports are another pair of wheels.

6. The collection bag holder of claim 1 wherein said spaced end segments of the base portion each include upper and lower arms connected at opposite ends to form box-like base elements, upper arms of the base elements being connected together laterally and lower arms of the base elements being connected with said wheels and said supports.

* * * * *